US007222436B1

(12) United States Patent
Price et al.

(10) Patent No.: US 7,222,436 B1
(45) Date of Patent: May 29, 2007

(54) PROCESS FOR PERFORATING PRINTED OR EMBOSSED SUBSTRATES

(75) Inventors: Jonathan Lee Price, Cincinnati, OH (US); Prabhath Kiran Nanisetty, Crestview Hills, KY (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 11/495,110

(22) Filed: Jul. 28, 2006

(51) Int. Cl.
*G01B 5/04* (2006.01)

(52) U.S. Cl. .......................................... 33/751; 33/750

(58) Field of Classification Search .................. 33/701, 33/706, 709–712, 732–737, 739, 744, 747, 33/750–751

See application file for complete search history.

(56) References Cited

U.S. PATENT DOCUMENTS

| | | | |
|---|---|---|---|
| 680,533 | A | 8/1901 | Marinier et al. |
| 690,822 | A | 1/1902 | Avril |
| 1,716,237 | A | 6/1929 | Molins |
| 2,054,313 | A | 9/1936 | Bright |
| 2,667,426 | A | 1/1954 | Davis |
| 2,681,612 | A | 6/1954 | Reimann |
| 2,746,387 | A | 5/1956 | Neumann |
| 2,858,232 | A | 10/1958 | Hushebeck et al. |
| 3,024,154 | A | 3/1962 | Singleton et al. |
| 3,097,844 | A | 7/1963 | Huck |
| 3,414,459 | A | 12/1968 | Wells |
| 3,556,907 | A | 1/1971 | Nystrand |
| 3,573,136 | A | 3/1971 | Gardner |
| 3,594,552 | A | 7/1971 | Adamson et al. |
| 3,681,159 | A | 8/1972 | Portnoy et al. |
| 3,840,421 | A | 10/1974 | Peterson |
| 3,847,047 | A | 11/1974 | Jackson |
| 3,867,225 | A | 2/1975 | Nystrand |
| 3,914,047 | A | 10/1975 | Hunt, Jr. et al. |
| 3,945,870 | A | 3/1976 | Johnsen |
| 3,958,051 | A | 5/1976 | Smith |
| 4,135,024 | A | 1/1979 | Callahan et al. |
| 4,177,730 | A | 12/1979 | Schriber et al. |
| 4,191,609 | A | 3/1980 | Trokhan |

(Continued)

FOREIGN PATENT DOCUMENTS

| | | |
|---|---|---|
| CA | 1143614 | 3/1983 |

(Continued)

OTHER PUBLICATIONS

U.S. Appl. No. 11/495,088, filed Jul. 28, 2006, Nanisetty et al.

*Primary Examiner*—Yaritza Guadalupe-McCall
(74) *Attorney, Agent, or Firm*—Peter D. Meyer; Betty J. Zea

(57) ABSTRACT

A process for registering lines of termination with indicia in a transported sheet of web material is disclosed. The process provides for the steps of: (a) transporting the sheet of web material in a first direction; (b) applying indicia to the sheet from a print cylinder, the print cylinder having a first angular position; (c) imparting lines of termination to the sheet of web material with a rotatable blade, the rotatable blade having a second angular position; (d) calculating a position error by comparing the first angular position of the print cylinder and the second angular position of the rotatable blade; and, (e) adjusting the second angular position of the rotatable blade according to the position error.

20 Claims, 2 Drawing Sheets

U.S. PATENT DOCUMENTS

| | | | | |
|---|---|---|---|---|
| 4,264,957 | A | | 4/1981 | Pautzke |
| 4,279,369 | A | | 7/1981 | Passafiume |
| 4,361,260 | A | | 11/1982 | Hanlan |
| 4,415,978 | A | | 11/1983 | Craemer et al. |
| 4,416,534 | A | | 11/1983 | Kluger |
| 4,423,676 | A | | 1/1984 | Neel |
| 4,426,898 | A | | 1/1984 | Friberg |
| 4,444,103 | A | | 4/1984 | Cronin |
| 4,449,433 | A | | 5/1984 | Miyamoto |
| 4,469,344 | A | | 9/1984 | Herrig |
| 4,495,582 | A | | 1/1985 | Dessert et al. |
| 4,512,256 | A | | 4/1985 | Schriber et al. |
| 4,637,859 | A | | 1/1987 | Trokhan |
| 4,734,868 | A | | 3/1988 | Delacy |
| 4,736,446 | A | | 4/1988 | Reynolds et al. |
| 4,737,904 | A | | 4/1988 | Ominato |
| 4,751,879 | A | | 6/1988 | Van Pelt |
| 4,757,930 | A | | 7/1988 | Ditto |
| 4,781,090 | A | | 11/1988 | Feldkamper et al. |
| 4,795,510 | A | | 1/1989 | Wittrock et al. |
| 4,795,513 | A | | 1/1989 | Jensen, Jr. |
| 4,805,111 | A | | 2/1989 | Steidel |
| 4,837,715 | A | | 6/1989 | Ungpiyakul et al. |
| 4,896,605 | A | | 1/1990 | Schroder |
| 4,914,477 | A | | 4/1990 | Young et al. |
| 4,955,265 | A | | 9/1990 | Nakagawa et al. |
| 4,961,149 | A | | 10/1990 | Schneider et al. |
| 4,963,899 | A | | 10/1990 | Resch, III |
| 4,994,975 | A | | 2/1991 | Minschart |
| 5,000,727 | A | | 3/1991 | Hatchell et al. |
| 5,016,182 | A | | 5/1991 | Berland et al. |
| 5,045,135 | A | | 9/1991 | Meissner et al. |
| 5,062,360 | A | | 11/1991 | Germann et al. |
| 5,063,416 | A | | 11/1991 | Honda et al. |
| 5,066,352 | A | | 11/1991 | Albers et al. |
| 5,117,753 | A | | 6/1992 | Mamberer |
| 5,119,725 | A | * | 6/1992 | Okamura .................... 101/226 |
| 5,123,343 | A | | 6/1992 | Willer |
| 5,129,568 | A | | 7/1992 | Fokos et al. |
| 5,160,946 | A | | 11/1992 | Hwang |
| 5,235,515 | A | | 8/1993 | Ungpiyakul et al. |
| 5,245,025 | A | | 9/1993 | Trokhan et al. |
| 5,270,769 | A | | 12/1993 | Satoh et al. |
| 5,286,543 | A | | 2/1994 | Ungpiyakul et al. |
| 5,292,299 | A | | 3/1994 | Anderson et al. |
| 5,294,475 | A | | 3/1994 | McNeil |
| 5,339,730 | A | | 8/1994 | Ruppel et al. |
| 5,341,824 | A | | 8/1994 | Fletcher et al. |
| 5,390,599 | A | | 2/1995 | Matsumoto et al. |
| 5,401,110 | A | | 3/1995 | Neeley |
| 5,417,638 | A | | 5/1995 | Anderson et al. |
| 5,449,200 | A | | 9/1995 | Andric et al. |
| 5,452,632 | A | | 9/1995 | Durr et al. |
| 5,458,059 | A | | 10/1995 | Ishii |
| 5,458,062 | A | | 10/1995 | Goldberg et al. |
| 5,468,323 | A | | 11/1995 | McNeil |
| 5,488,480 | A | | 1/1996 | Saindon et al. |
| 5,518,559 | A | | 5/1996 | Saindon et al. |
| 5,530,323 | A | | 6/1996 | Breitzmann |
| 5,568,767 | A | | 10/1996 | Jackson |
| 5,587,032 | A | | 12/1996 | Saindon et al. |
| 5,622,106 | A | | 4/1997 | Rayner |
| 5,637,194 | A | | 6/1997 | Ampulski et al. |
| 5,641,563 | A | | 6/1997 | Truong et al. |
| 5,656,333 | A | | 8/1997 | Truong et al. |
| 5,660,674 | A | * | 8/1997 | Saindon et al. ............. 156/353 |
| 5,701,180 | A | | 12/1997 | Saindon et al. |
| 5,711,225 | A | | 1/1998 | Rasmussen |
| 5,720,223 | A | * | 2/1998 | Meschi ....................... 101/227 |
| 5,724,891 | A | | 3/1998 | Lovison |
| 5,743,184 | A | | 4/1998 | Skudrzyk |
| 5,795,280 | A | | 8/1998 | Fowler et al. |
| 5,802,974 | A | | 9/1998 | McNeil |
| 5,802,979 | A | | 9/1998 | Lovison |
| 5,861,078 | A | | 1/1999 | Huben et al. |
| 5,940,105 | A | | 8/1999 | Havami |
| 5,964,151 | A | | 10/1999 | Mathea |
| 6,030,690 | A | | 2/2000 | McNeil et al. |
| 6,047,642 | A | | 4/2000 | Hunkeler |
| 6,050,061 | A | | 4/2000 | Todd et al. |
| 6,086,715 | A | | 7/2000 | McNeil |
| 6,113,723 | A | | 9/2000 | McNeil et al. |
| 6,129,972 | A | | 10/2000 | McNeil et al. |
| 6,142,407 | A | | 11/2000 | McNeil et al. |
| 6,164,200 | A | | 12/2000 | Mathea |
| 6,183,671 | B1 | | 2/2001 | Stauffacher et al. |
| 6,195,967 | B1 | | 3/2001 | Todd et al. |
| 6,247,293 | B1 | | 6/2001 | Todd et al. |
| 6,272,815 | B1 | | 8/2001 | Todd et al. |
| 6,272,982 | B1 | | 8/2001 | Stauffacher et al. |
| 6,277,466 | B1 | | 8/2001 | McNeil et al. |
| 6,395,133 | B1 | | 5/2002 | McNeil |
| 6,475,128 | B1 | | 11/2002 | Wallace et al. |
| 6,564,710 | B1 | | 5/2003 | Mathea |
| 6,928,929 | B1 | | 8/2005 | McNeil |
| 6,983,686 | B2 | | 1/2006 | Vaughn et al. |
| 2002/0048662 | A1 | | 4/2002 | Bredahl et al. |
| 2004/0182830 | A1 | * | 9/2004 | Hesterman ............... 219/121.6 |

FOREIGN PATENT DOCUMENTS

| | | | |
|---|---|---|---|
| CA | 1161525 | | 1/1984 |
| CA | 1173136 | | 8/1984 |
| EP | 0 267 861 | A2 | 5/1988 |
| EP | 1 304 215 | A1 | 10/2001 |
| GB | 2 359 300 | | 8/2001 |
| GB | 2 359 300 | A | 8/2001 |
| JP | 7-178892 | | 7/1995 |
| NL | 1000305 | | 11/1996 |
| WO | WO 92/05959 | | 4/1992 |

* cited by examiner

PROCESS FOR PERFORATING PRINTED OR EMBOSSED SUBSTRATES

FIELD OF THE INVENTION

The present invention relates to a process for registering indicia with lines of termination in a sheet material. The lines of termination may be perforations or a chop-off which ends a first sheet and starts a second sheet, such sheets being typically presented in roll form. Indicia may be visual, such as printed inks or embossments, or may be functional, such as adhesive.

BACKGROUND OF THE INVENTION

Sheets for household use are well known in the art. It is often desirable to decorate such sheets, such as by printing. Printing can impart an aesthetically pleasing pattern to the sheet. Alternatively, the sheet may be embossed to impart an aesthetically pleasing pattern which is also tactually discernible.

Such sheets are typically made in continuous form and then later cut to discrete lengths as desired. Such cutting to discrete lengths may occur at the point of use, such as is caused by the consumer detaching one sheet from the balance thereof at a line of termination. For this purpose, the line of termination typically comprises a line of weakness, such as a perforation. Alternatively, the continuous sheet may be cut into discrete portions prior to the point of use. Such arrangement often occurs in individual napkins or facial tissues that are cut during manufacture and purchased by the consumer as discrete units.

It has been relatively facile in the prior art to register indicia with a cross-machine direction of such sheets while such sheets are transported in a continuous fashion during manufacturing. However, it is difficult to register the indicia in the machine direction and particularly difficult to register the indicia with lines of termination of such sheet materials.

One manner in which the foregoing difficulties have been addressed is to keep the length of the sheet material disposed between application of the indicia and the deposition of lines of weakness therein relatively short. However, this approach does not provide for feasibility in manufacturing processes, can require smaller sized equipment, and is infeasible where any modules necessary to impart such lines of weakness, or for the application of the indicia, provide a web path that is large enough to cause improper spacing between the indicia and the lines of weakness.

Other processes may provide acceptable results with regard to processing of a single type of web material, such as short sheets, but not work acceptably where longer sheet lengths are required. For example, one approach provides for a relatively short path length between the point at which the latter of the indicia and/or lines of termination are applied or imparted to the sheet and the point at which the continuous sheet is cut into separate discrete units at the point of manufacture. However, where relatively longer sheet lengths are required (i.e., rolled products, such as toilet tissue or paper toweling), difficulties are introduced by the cumulative error that occurs over the length of the continuous sheet. For example, a misregistration of 0.001 inches at the first repeat unit will provide a misregistration of 1 inch after the manufacture of 1,000 inches of sheet material.

The processes of the prior art provide for even larger problems when a parent roll being processed is exhausted and a new parent roll is started. A parent roll is a large roll of product that is later converted to multiple individual sheets by the apparatus and process disclosed herein. It should be known to those of skill in the art that different parent rolls have different properties which can affect the transport of the sheet through a manufacturing apparatus. By way of example, the amount of stretch in the sheet material as it travels through the apparatus frequently varies greatly between different parent rolls. As these properties vary, so does the registration of the indicia with the lines of termination. Such variations in registration must be accounted for in the manufacturing process.

Accordingly, it should be apparent to those of skill in the art that the approaches that may be feasible when dealing with longer sheet lengths are not sufficient for dealing with registration difficulties that occur in shorter sheet lengths and vice versa. Thus, it would be useful to provide a mechanism for overcoming these problems associated with misregistration between indicia and lines of termination in products having longer unit lengths and, in particular, core wound paper products and yet be flexible enough to deal with discrete articles of relatively short unit length. Additionally, it would be useful to provide for adjustments to the spacing between indicia and lines of termination while the sheet is being processed into consumer goods.

SUMMARY OF THE INVENTION

The present invention provides for a process for registering lines of termination with indicia in a transported sheet of web material. The process comprises the steps of: (a) transporting the sheet of web material in a first direction; (b) applying indicia to the sheet from a print cylinder, the print cylinder having a first angular position; (c) imparting lines of termination to the sheet of web material with a rotatable blade, the rotatable blade having a second angular position; (d) calculating a position error by comparing the first angular position of the print cylinder and the second angular position of the rotatable blade; and, (e) adjusting the second angular position of the rotatable blade according to the position error.

An alternative embodiment for the present invention comprises the steps of: (a) transporting the sheet of web material in a first direction; (b) applying indicia to the sheet of web material from a print cylinder, the print cylinder having a first angular position; (c) imparting lines of termination to the sheet of web material with a perforation cylinder, the perforation cylinder having a second angular position, the lines of termination being spaced from the indicia in a spacing; (d) calculating a position error by comparing the first angular position of the print cylinder and the second angular position of the perforation cylinder; and, (e) adjusting the second angular position of the perforation cylinder according to the position error in order to maintain the spacing within a desired range.

Yet another alternative embodiment for the present invention comprises the steps of: (a) transporting said sheet of web material in a first direction; (b) applying indicia to said sheet of web material from at least a first print cylinder having a first angular position; (c) imparting lines of termination to said sheet of web material with at least a first perforation cylinder having a second angular position, wherein said indicia and said lines of termination are disposed upon said sheet of web material relative to each other such that an indicia/lines of termination registration is created; (d) measuring an angular position of a first print cylinder and translating said position into a digital signal; (e) measuring an angular position of a first perforation cylinder and translating said position into a digital signal; (f) comparing said digital signal of said first print cylinder and said digital signal of said first perforation cylinder to provide a position error; and, (g) correcting said angular position of said first perforation cylinder according to said position error in order to maintain said indicia/lines of termination registration within a desired range.

DETAILED DESCRIPTION OF THE INVENTION

Figure 1:
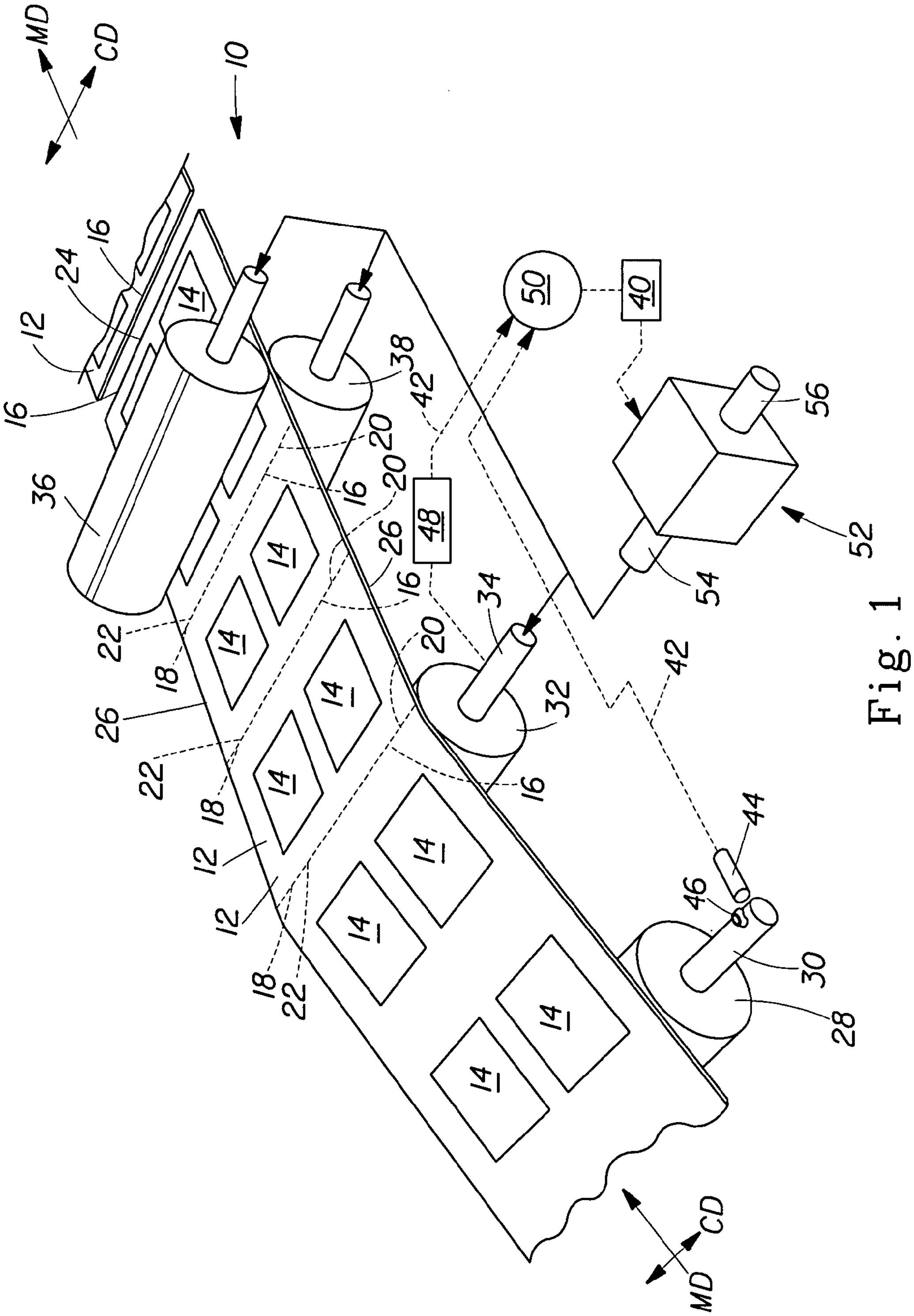
FIG. 1 is a schematic perspective view of an apparatus according to the present invention having control signals designated by dash lines and mechanical connections designated by solid lines; and, FIG. 2 is an elevational schematic view of an apparatus according to the present invention.

As used herein, a "unit" is defined as that portion of the sheet that is discrete as delivered to the consumer. For example, this would include, but not be limited to, a single table napkin, a single roll of paper toweling, a single facial tissue, or a single roll of bath tissue.

As used herein, "continuous" means a relatively long product produced in a mostly continuous manufacturing process. A preferred but non-limiting example of a continuous product for use in the present process or apparatus is a rolled sheet where the length of the sheet on the roll is very long in relation to its width. The roll may or may not have a fixed length but becomes substantially continuous by splicing webs together to allow the process to run for much longer lengths of time.

As used herein, a "web" or a "sheet" refers to any thin, permeable, or impermeable substrate consistent and intended for use with the present invention. A web or sheet is characterized in being much longer in the machine direction than in the cross-machine direction and is generally handled in rolls of substrate. Such a web or sheet has two surfaces—a first or top surface and a second or back surface—as processed through the equipment.

A "stretchable substrate" refers to any material including, but not limited to, paper, polymeric or plastic films, cloths, or fabrics, woven materials, non-woven materials, laminates, and combinations thereof that stretch when subjected to a tensile force.

The term "registration" means the degree to which the indicia and lines of termination are disposed on the substrate in a specific relationship to one another. The relationship may be one where the indicia and lines of termination are separated from each other. However, the relationship may also be considered to be one where the indicia and the line of termination overlap resulting in a synergistic visual interaction between the image and/or line of termination. A perfect registration or registration with zero error occurs when the indicia and the line of termination are disposed onto a substrate in exactly the specific designated relationship to each other. Thus, it follows that the term "misregistration" means the degree to which the relative location of the indicia and line of termination are not in the specific designated relationship to each other.

The term "machine direction" is the term of art used to define the dimension on the processed sheet parallel to the direction of travel that the sheet takes through the machine consistent with use of the present invention. The term "cross-machine direction" refers to the dimension on the sheet perpendicular to the direction of travel through the machines and co-planar thereto.

Sheet 12, according to the present invention, is generally planar, soft, and absorbent. The sheet 12 is generally suitable for use in applications such as bath tissue, paper toweling, placemats, napkins, facial tissue, and the like. The sheet 12 is preferably wound in roll form; however, can be provided in discrete units. In a preferred embodiment, the sheet 12 is cellulosic and preferably paper. However, sheet 12 in the form of films, foils, metal, and the like are also consistent with use of the instant invention. Cellulosic sheets can be made and/or processed in a manner consistent with U.S. Pat. Nos. 4,191,609; 4,637,859; and 5,245,025.

As illustrated, the sheet 12 is preferably manufactured in a continuous process and then later cut into discrete units according to how the final product will be distributed to the consumer. Discrete units can include roll products, such as paper toweling and bath tissue, as well as individual sheets, such as table napkins and facial tissue. The sheet 12 is preferably presented to the consumer as an individual unit having a sheet length.

The product is preferably presented to the consumer in roll form convolutely wound in a spiral about a core to yield a core wound paper product. The core wound paper product has a length taken in the principal or machine direction. Indicia 14 and lines of termination 16 are disposed in spaced relation throughout the sheet 12. The indicia 14 may be intermediate or straddle adjacent lines of termination 16. Coincident with each line of termination 16 is a leading edge 18 and a trailing edge 20 of the sheet 12, the leading edge 18 being ahead of the trailing edge 20 in the manufacturing process.

In a preferred embodiment, the sheet 12, according to the instant invention, is presented to the consumer as convolutely wound or rolled paper product. Such a product is suitable for use as paper toweling, bath tissue, facial tissue, napkins, and the like. The sheet 12 may have a length in the principal direction of at least 500 inches, preferably at least about 700 inches, more preferably at least about 900 inches, and most preferably at least about 1,100 inches.

Figure 2:
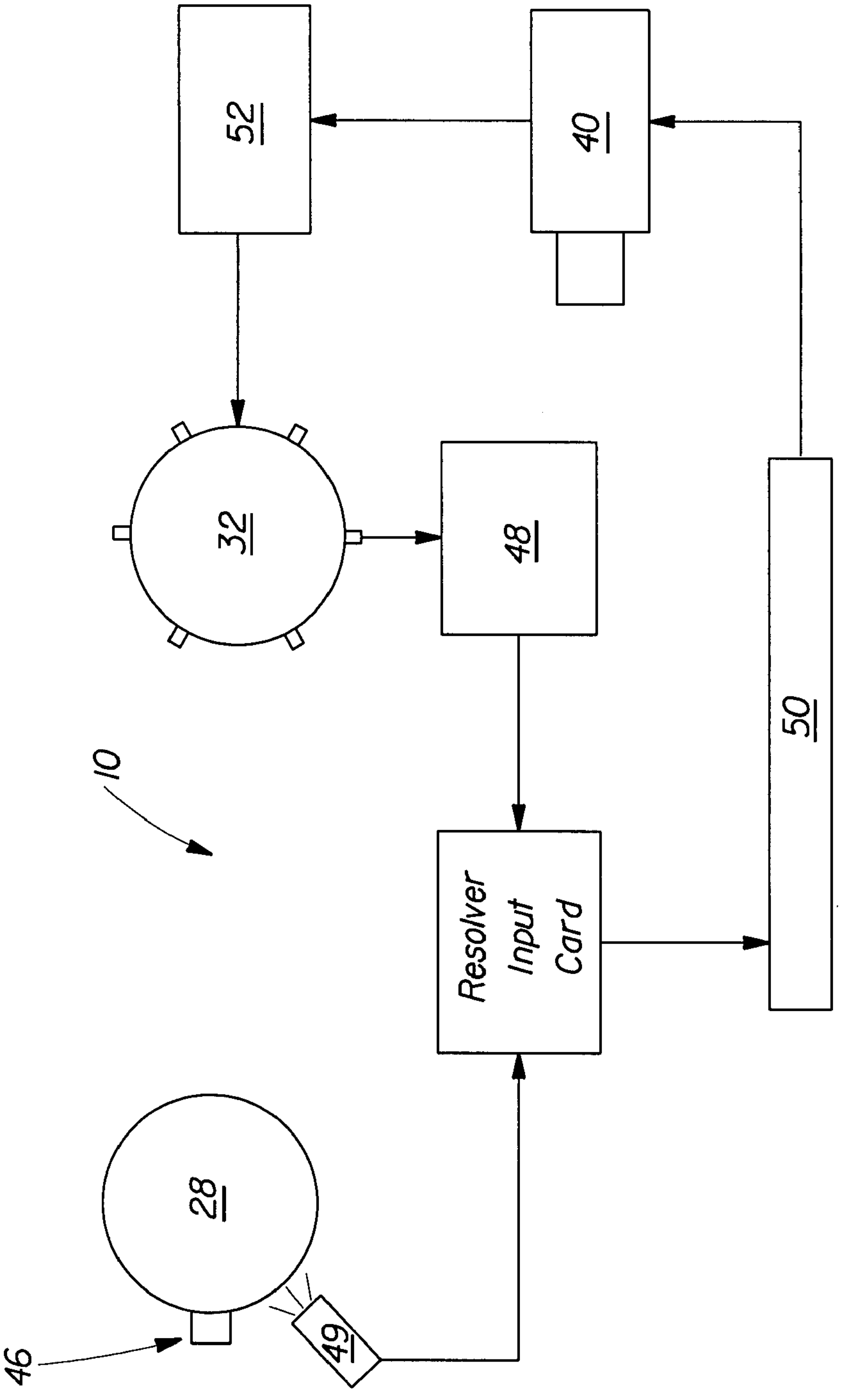

Referring to FIG. 1, and shown schematically in FIG. 2, intermediate the lines of termination 16 that define the length of the sheet 12, may be disposed a plurality of lines of termination 16 which provide a line of weakness. Preferably, such lines of weakness comprise perforations 22. The perforations 22 may be spaced on a pitch of about 4.0 to 20 inches, with a preferred pitch of about 4.5 to 14 inches, and a more preferred pitch of about 12.0 to 12.5 inches. The perforations 22 are generally oriented in the cross-machine direction and are generally orthogonal to the direction of transport of the sheet 12 through the apparatus 10. Preferably, but not necessarily, the perforations 22 extend throughout the width of the product formed by sheet 12, as measured between the longitudinal axis 26 of the sheet 12.

In such an embodiment, the indicia 14 are maintained in space relationship to the perforations 22. Preferably, the indicia 14 are registered between the perforations 22 and juxtaposed with both the leading edge 18 and trailing edge 20 of the sheet 12. In this manner, symmetry about the cross-machine direction centerline of the sheet 12 is obtained. Optionally, indicia 14 may be registered with the longitudinal edges 26 of the sheet 12 so that symmetry about the machine direction centerline of the sheet 12 is also obtained.

The length of a sheet 12 is its unfolded dimension taken in a first direction. The first direction is coincident with the machine direction of the sheet 12 during its manufacture and while in continuous form. The first direction is also the principal direction of the sheet 12 length. Plies or layers making up the sheet 12 are not separated when determining its overall length. Lines of termination 16 are the lines separating the sheet 12 into discrete units if such separation has not been performed at the time of manufacture. Typical lines of termination 16 may include both perforations 22 and chop-off cuts 24. Perforations 22 are generally lines of weakness that allow separation of the sheet 12 into discrete units by the consumer as required. Chop-off cuts 24 separate an individual sheet 12 from an adjacent sheet 12 in the manufacturing process or terminate one roll and start the succeeding roll in the manufacturing process.

Preferably, the lines of termination 16 (particularly, the perforations 22) are oriented in the cross-machine direction and are transverse to the first direction of transport of the sheet 12. Alternatively, it will be recognized that lines of termination 16, having a diagonal orientation or having any other spaced relationship in the machine direction, may be utilized.

Two longitudinal edges 26 connect the leading edge 18 and trailing edge 20. The longitudinal edges 26 are oriented substantially in the longitudinal or first direction. As shown, the longitudinal edges 26 are generally straight and parallel, and leading edge 18 and trailing edge 20 are generally straight and parallel. It should be recognized by one of ordinary skill in the art that, depending upon the arrangement used to cut the longitudinal edges 26 from the trim of the sheet 12, the longitudinal edges 26 need not be either straight or parallel, as shown in the preferred embodiment. Likewise, the leading edge 18 and trailing edge 20 need not be straight or parallel, as shown.

The sheet 12 is transported through the apparatus 10 by any suitable means. Typically, the sheet 12 is drawn through the apparatus 10 under tension. Tension may be applied to the sheet 12 by winding it about a rotatable reel. The rotatable reel may be cylindrical and driven by an electric motor at a predetermined angular velocity.

Juxtaposed with the leading edge 18 and trailing edge 20 of the sheet 12 and generally oriented in a second direction, which is within the plane of the sheet 12 and generally orthogonal to the first direction (i.e., cross-machine direction), are indicia 14. The indicia 14 are spaced from the lines of termination 16 so that a spaced relationship is formed therebetween. The spaced relationship is predetermined and may be adjusted during manufacture. The indicia 14 may be aesthetically pleasing and printed either in a single color or in a plurality of colors. Alternatively, the indicia 14 may be embossed upon sheet 12.

Preferably, the indicia 14 are applied to the sheet 12 while it is being transported through the apparatus 10, as described infra. The indicia 14 may be applied to the sheet 12 by any means known in the art suitable for the application of spaced indicia 14 at a predetermined repeating interval. In a preferred embodiment, the indicia 14 are printed onto the sheet 12 from a rotatable cylinder. The rotatable cylinder may be driven about a central axis 30 at a predetermined angular velocity. Suitable printing processes known in the art include gravure printing and flexographic printing. A print cylinder 28 or other means for the application of indicia 14 to the sheet 12 may be used. Such a print cylinder 28 may be driven by any suitable means, such as an electric motor.

If it is desired to emboss the indicia 14 onto the sheet 12, any embossing technique known in the art would be suitable. Such embossing processes are described in U.S. Pat. Nos. 3,414,459; 3,556,907; and 5,294,475.

In an alternative embodiment, the indicia 14 may impart functional properties to the sheet 12 rather than visual or aesthetically pleasing properties. In such embodiment, the indicia 14 may comprise adhesive as, for example, would be used to join two plies together to form a sheet 12 having a double thickness. Alternatively, functional indicia 14 can be used to change properties at one portion of the sheet 12 relative to another portion of the sheet 12. For example, adhesive used to join the tail of a core wound product to the periphery of the product may be applied to the sheet 12, as well as adhesive used to join the leading edge 18 of a sheet 12 to the core about which the sheet 12 is wound.

Additionally, known additives that increase the softness, wet strength, temporary wet strength, hydrophobicity, hydrophilicity, or other property that functionally affects any other property of the sheet 12 may be applied thereto.

Typically, the means for the application of indicia 14 need only have the capability of applying the indicia 14 in spaced apart relationship in the first direction and to apply the indicia 14 at a frequency yielding indicia 14 at predetermined repeating intervals. The indicia 14 may be applied by any suitable system. However, a particularly preferred embodiment utilizes a rotatable print cylinder 28 driven to rotate about a central axis 30, as described supra.

In addition to indicia 14 being applied at repeating intervals spaced apart in the first direction and in spaced relationship to the lines of termination 16, indicia 14 may be juxtaposed with one or both of the longitudinal edges 26. If each of the leading edges 18 trailing edges 20 and longitudinal edges 26 has indicia 14 juxtaposed therewith, a border is formed in the sheet 12. This border can define and enhance the appearance or functionality of the sheet 12.

The lines of termination 16 may be applied by any suitable means for imparting lines of termination 16 to the sheet 12. The suitable means should also apply the lines of termination 16 at a frequency that yields predetermined repeating intervals. As noted above, the lines of termination 16 may totally separate the continuous sheet 12 into discrete units or may provide lines of weakness, such as perforations 22. Suitable means for imparting the lines of termination 16 to sheet 12 include blades that are generally orthogonal to and impart lines of termination 16 generally orthogonal to the first direction of transport of the sheet 12 and which define adjacent leading edges 18 and trailing edges 20 of successive sheets 12. A suitable means for imparting lines of termination 16 comprises a rotatable blade 32 driven about a central axis 34 at a predetermined angular velocity on a perforator roll. Naturally, one or more rotatable blades 32 may be driven on a common shaft, as is known in the art.

If the line of termination 16 is a chop-off 24, it may be accomplished by two rotatable rolls juxtaposed together. The two rotatable rolls may comprise a chop-off roll 36 and a bedroll 38, as is known in the art. Of course, even if the lines of termination 16, which are the subject of the instant invention, are perforations 22, the apparatus 10 will likely still comprise a chop-off roll 36 and a bedroll 38 to separate adjacent sheets 12, each having a plurality of perforations 22. Such rotatable blades 32 or any other means selected for imparting lines of termination 16 upon sheet 12 may be driven by any suitable means, such as an electric motor. If a both a perforator blade and a chop-off blade are used in the apparatus 10, they may be driven by independent motors or by a common motor. A first type of motor suitable for use with the present invention comprises one or more draw or drive motors that impart an angular velocity to one or more rotatable components of the apparatus 10. Such a motor may be connected to the rotatable component through a differential 52. A differential 52 may comprise a mechanical drive capable of altering the angular velocity of an output shaft 54 to a desired degree of resolution of the base line angular velocity. The output shaft 54 of the differential 52 is preferably coupled to the rotatable component.

A second type of motor suitable for use with the instant invention is a correction motor—typically, a servo motor. This type of motor preferably drives a cage of the differential 52 so that the angular velocity of the cage is superimposed with the angular velocity of the input shaft 56. Such super position can yield a very accurate and well controlled angular velocity at the output shaft 54. Such correction motors can be precisely and accurately adjusted to the particular angular velocity independent of the angular velocity of the draw or drive motor. Moreover, as the angular velocity of the draw or drive motor changes, compensation can be made by the correction motor as the sheet 12 is being transported through the apparatus 10 without interruption of the transport of the sheet 12. Compensation can be also be made as the sheet 12 is being transported through the apparatus 10 and without interruption of the transport of the sheet 12 should web tension change or should any other factor change the spaced relationship between the lines of termination 16 and the indicia 14.

The lines of termination 16 and indicia 14 may be imparted and applied to the sheet 12, respectively, in any desired order. However, the latter of the lines of termination 16 and indicia 14 to be imparted or applied to the sheet 12 constitutes the operation controlled by the apparatus 10 to maintain the desired spaced relationship therebetween. By way of example, the indicia 14 are applied to the sheet 12. Then, the lines of termination 16 are imparted to the sheet 12. If the sheet 12 has both perforations 22 and a chop-off cut 24, typically the perforations 22 are imparted prior to the chop-off cut 24. In the above described system, having the indicia 14 applied first, the desired spacing of the lines of termination 16 relative to the indicia 14 is achieved and maintained by adjusting the placement of the lines of termination 16 rather than by adjusting the placement of the indicia 14.

The apparatus 10 of the instant invention may also comprise a sheet length correction motor 40. The sheet length correction motor 40 controls the angular velocities of the rotatable blade 32, chop-off roll 36, and bedroll 38. If the product is supplied as a convolutely wound product as, for example, is common with paper toweling and bath tissues, the sheet length correction motor 40 may further control the angular velocity of an indexing turret (not shown) and any core loading functions of that turret. The turret winds the product onto the core and performs the other functions ancillary to core winding, such as core loading onto a mandrel, applying adhesive to the core, chop-off of the sheet 12, applying tail seal adhesive to the end of the sheet 12, and the like. It is preferred that the differential 52 be disposed functionally intermediate the sheet length correction motor 40 and the rotatable blade 32 that imparts the lines of termination 16 to the sheet 12.

Referring again to FIG. 1, and as shown schematically in FIG. 2, the apparatus 10 of the present invention preferably comprises a means for measuring the angular location of the print cylinder 28 and translating that location into a digital signal 42. Such a system could be used on either of the print cylinder 28 or rotatable blade 32 or the chop-off roll 36 and bedroll 38. This method preferably provides for a proximity switch 44 that senses a flag 46 or other marker disposed upon the print cylinder 28 or the central axis 30 cooperatively associated thereto. The proximity switch 44 creates a digital signal 42 for each revolution of print cylinder 28 or the central axis 30 cooperatively associated thereto. A suitable proximity switch 44 is available from Turck, Inc. A preferred, but non-limiting, embodiment of the present invention uses a model Ni5-G12-AN6X-H1141 inductive proximity switch. As would be readily recognized by one of skill in the art, multiple flags 46 or other markers may be disposed upon print cylinder 28 or central axis 30 cooperatively associated thereto in order to provide for increased resolution of the angular position of print cylinder 28 or to provide for more advanced timing needs as required by the process or sheet 12 utilizing apparatus 10.

The apparatus 10 further comprises a means for determining the position of the rotatable blade 32 or the print cylinder 28, whichever occurs later in the process. A device suitable for determining such a position is a position resolver 48 cooperatively associated with the rotatable blade 32 or other component, such as the chop-off roll 36 and/or bedroll 38 that is controlled in response to an error signal.

A suitable position resolver 48 is capable of determining angular position within at least 0.1 degrees. In a preferred embodiment, the position resolver 48 provides for 4,096 pulses per rotation. A suitable, but non-limiting, position resolver 48 is Reliance model number 57C360 available from Rockwell Automation. In a particularly preferred, but non-limiting, embodiment, the resolver may be used in conjunction with a resolver input module such as Reliance model number 57C411 manufactured by Rockwell Automation. If desired, an encoder can be substituted for the position resolver 48, provided appropriate control logic, as is known in the art, is utilized. As would be readily recognized by one of skill in the art, multiple position resolvers 48 may be cooperatively associated with the rotatable blade 32 or other component(s), such as the chop-off roll 36 and/or bedroll 38 in order to provide for increased resolution of the angular position of the rotatable blade 32 or other component or to provide for more advanced timing needs as required by the process or sheet 12 utilizing apparatus 10.

The apparatus 10 of the instant invention may further comprise a signal comparator 50. The signal comparator 50 is capable of subtracting two input signals to produce an error signal. The first input signal to the signal comparator 50 is the angular position at least once per revolution of print cylinder 28 provided by proximity switch 44 disposed upon print cylinder 28 or the central axis 30 cooperatively associated thereto. The digital signal 42 may be provided in seconds based upon the speed of rotation of print cylinder 28 having a flag 46 or other marker disposed thereon or the central axis 30 cooperatively associated thereto. A suitable signal comparator is programmatically created within machine hardware and processed via a processor module. An exemplary, but non-limiting, processor module suitable for use with the present invention that can execute such a signal comparator program is a Reliance model number 57C435 AutoMax 7010 Processor, manufactured by the Rockwell Automation.

The second input signal to the signal comparator 50 can be the angular position of rotatable blade 32 used for imparting lines of termination 16 to the sheet 12. The signal comparator 50 preferably subtracts the two input signals to yield an error signal. The apparatus 10 preferably makes the desired correction based upon the error signal. It would be known to one of skill in the art to convert the error signal to provide the desired correction using the sheet length correction motor 40. Preferably, when the error signal exceeds a pre-set value, the apparatus 10 makes the desired correction. The pre-set value is preferably the desired spacing between the indicia 14 and lines of termination 16. Apparatus 10 provides such correction by providing a change in speed of an appropriate motor, such as the sheet length correction motor 40.

The appropriate motor adjusts the placement of the lines of termination 16 on the sheet 12 so that the lines of termination 16 may be brought closer to, or further from, the indicia 14, thereby changing the spaced relationship therebetween. Such correction occurs while the sheet 12 is being transported through the apparatus 10 and without interruption of the transport. This moving correction is feasible because the appropriate motor is adjusted while it turns at a predetermined angular velocity. Alternatively, the means for changing the spaced relationship between the indicia 14 and the lines of termination 16 may incorporate changes to the path length of the sheet 12 through the apparatus 10. The path length of the sheet 12 may be changed by use of an idler roll, the application of tension to the sheet 12, and incrementally changing the angular velocity of either or both of the print cylinder 28 or the rotatable blade 32. A more complete discussion on the processes by which to change the path length of the sheet 12 between the print cylinder 28 and the rotatable blade 32 are described in U.S. Pat. No. 6,928,929.

It should be recognized by those of skill in the art that the spacing and/or registration between indicia 14 and lines of termination 16 can be physically measured during production or after production of sheet 12. Data from such physical measurements can be provided to apparatus 10 to provide for additional feedback regarding the registration between indicia 14 and lines of termination 16. One of skill in the art could identify that part of indicia 14 that allows for such measurements within the sheet 12 either during manufacturing (in situ) or after processing of sheet 12.

One of ordinary skill in the art will recognize that any of the foregoing means for changing the spaced relationship between the indicia 14 and the lines of termination 16 upon sheet 12 can be collectively considered as a means for changing the phase of the lines of termination 16 relative to the indicia 14 or vice versa. Such a change of phase can be accomplished by changing the phase of one or both of the means for imparting the lines of termination 16 or the means for applying the indicia 14 to the sheet 12 by introducing a temporary increase or decrease in the correction motor 40. It is in this way that a change in the position of a given line of termination 16 relative to a given indicia 14 and vice versa.

In operation, the sheet 12 is moved relative to the apparatus 10, preferably by holding the apparatus 10 stationary and drawing the sheet 12 through the apparatus 10 in the machine direction. The sheet 12 may be drawn through the apparatus 10 with the motor driving any suitable roll or rolls which frictionally engage the sheet 12 as it is drawn through the apparatus 10. A draw motor can be used in conjunction with a draw correction motor for this purpose.

Process

In a preferred embodiment of the present invention, the first step performed by the apparatus 10 is the application of indicia 14 to the sheet 12. The indicia 14 may be applied by a rotatable print cylinder 28 having a predetermined angular velocity, such as is used in flexographic or gravure printing. A rotatable print cylinder 28 is preferably driven independently from the draw motor and/or draw correction motor used to transport the sheet 12 through the apparatus 10.

The second step performed by the apparatus 10 is detection of the angular position of print cylinder 28. Detection of the angular position of print cylinder 28 or the central 30 axis cooperatively associated thereto is performed by a proximity switch 44 that senses the presence or absence of a flag 46 or other marker disposed upon print cylinder 28 or the central axis 30 cooperatively associated thereto.

The third step performed by the apparatus 10 is to impart the lines of termination 16 to the sheet 12. The lines of termination 16 are placed on the sheet 12 in spaced relationship to the indicia 14. The spacing is in the first or machine direction. The lines of termination 16 are preferably perforations 22 but may be chop-off cuts 24. The lines of termination 16 are preferably oriented in the cross-machine direction.

The fourth step performed by the apparatus 10 is determination of the position of the perforations 22, chop-off cuts 24, or other lines of termination 16. This determination is made by knowing the position of the rotatable blade 32 which imparts the perforations 22, chop-off cuts 24, or other lines of termination 16 to the sheet 12. The position of the rotatable blade 32 is given by a position resolver 48 and, hence, the perforations 22, chop-off cuts 24, or other lines of termination 16 imparted by the rotatable blade 32. The difference in position between the indicia 14 and lines of termination 16 is determined by a signal comparator 50. This difference constitutes a position error signal. If the difference exceeds in either direction a pre-set limit, correction is made preferably based upon the position error signal.

Correction may be made by adjusting the angular velocity of a draw correction motor, the sheet length correction motor 40, the rotatable blade 32, or the rotatable print cylinder 28. Preferably, the correction is made by adjusting the angular velocity of the sheet length correction motor 40. The sheet length correction motor 40 and the draw motor can control the angular velocity of the rotatable blade 32 which imparts the perforations 21, chop-off cuts 24, or other lines of termination 16, as well as the chop-off roll 36 and bedroll 38, as well as the functions downstream of the apparatus 10. In a preferred embodiment, the correction is preferably done by adjusting the angular velocity of the rotatable blade 32 relative to the velocity of the sheet 12. The angular velocity is increased or decreased, as required, until the error signal comes within a desired limit or is equal to zero.

It should be readily recognized by one of skill in the art that several sheets 12, according to the present invention, may be made in parallel by using multiple roll positions, as is known in the art. In such a process, a single web material having a width several times greater than the sheet 12 presented to the consumer as transported through the apparatus 10. As used herein, a "web" comprises a plurality of sheets 12 integral with one another and simultaneously transported through the apparatus 10 parallel to the cross-machine direction. The web can be later slit or cut in the machine direction into individual sheets. Trim may also be removed from the longitudinal edges 26 of the web, as discussed above, with respect to single sheet widths.

Additionally, multiple indicia 14 and multiple lines of termination 16 may be imparted to the sheet 12 in parallel across the width of the web. The web may be later slit or cut into individual sheets, as required. However, it should be recognized by one of skill in the art that in such an embodiment the means used for sensing the angular position of print cylinder 28 should be provided in a spaced relationship in the cross-machine direction. If desired, one may add a plurality of additional means for sensing the angular position of print cylinder 28 (such as proximity switch 44) as indicia 14 are applied to sheet 12 at intermediate positions across the width of the web.

It should also be readily recognized by one of skill in the art that it may be desired to adjust the cross-machine direction registration of the web. Misregistration of the web material in the cross-machine direction can cause skew in the aforementioned spaced relationship. Compensation for such skew can be provided by adjusting the path length of the web using techniques known to those of skill in the art. Such techniques may include the use of bowed rolls, curved axis rolls having fixed and variable radii or curvature, cocking rolls, Mount Hope rolls, and the like. Such devices may be used to change the path length of one portion of the web or even an individual sheet 12 relative to the balance of the web or sheet 12.

All documents cited in the Detailed Description of the Invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

Any dimensions and/or numerical values disclosed herein are not to be understood as being strictly limited to the exact dimension and/or numerical value recited. Instead, unless otherwise specified, each such dimension and/or numerical value is intended to mean both the recited dimension and/or numerical value and a functionally equivalent range surrounding that dimension and/or numerical value. For example, a dimension disclosed as "40 mm" is intended to mean "about 40 mm."

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A process for registering lines of termination with indicia in a transported sheet of web material, the process comprising the steps of:
- (a) transporting said sheet of web material in a first direction;
- (b) applying indicia to said sheet from a print cylinder, said print cylinder having a first angular position;
- (c) imparting lines of termination to said sheet of web material with a rotatable blade, said rotatable blade having a second angular position;
- (d) calculating a position error by comparing said first angular position of said print cylinder and said second angular position of said rotatable blade; and,
- (e) adjusting said second angular position of said rotatable blade according to said position error.

2. The process of claim 1 wherein said step (b) further comprises the step of determining said first angular position.

3. The process of claim 2 wherein said step of determining said first angular position further comprises the step of using a proximity switch that senses a flag or other marker disposed proximate said print cylinder.

4. The process of claim 1 wherein said step (c) further comprises the step of determining said second angular position.

5. The process of claim 4 wherein said step of determining said second angular position further comprises the step of using a position resolver cooperatively associated with said rotatable blade.

6. The process of claim 1 further comprising the step of adjusting said second angular position of said rotatable blade when said position error exceeds a preset value.

7. The process of claim 1 wherein said step (c) further comprises the step of imparting perforations to said sheet of web material with said rotatable blade.

8. The process of claim 1 further comprising the step of providing said sheet of web material with chop-off cuts.

9. The process of claim 8 wherein said step of providing said sheet of web material with chop-off cuts further comprises the step of providing said chop-off cuts with a chop-off blade.

10. The process of claim 9 further comprising the step of driving said rotatable blade and said chop-off blade with a common motor.

11. The process of claim 1 further comprising the step of providing said sheet of web material as a material selected from the group consisting of paper, films, foils, metal, polymeric or plastic films, cloths, fabrics, woven materials, non-woven materials, laminates, and combinations thereof.

12. A process for registering lines of termination with indicia in a transported sheet of web material, the process comprising the steps of:
- (a) transporting said sheet of web material in a first direction;
- (b) applying indicia to said sheet of web material from a print cylinder, said print cylinder having a first angular position;
- (c) imparting lines of termination to said sheet of web material with a perforation cylinder, said perforation cylinder having a second angular position, said lines of termination being spaced from said indicia in a spacing;
- (d) calculating a position error by comparing said first angular position of said print cylinder and said second angular position of said perforation cylinder; and,
- (e) adjusting said second angular position of said perforation cylinder according to said position error in order to maintain said spacing within a desired range.

13. The process of claim 12 further comprising the step of determining an actual spacing of said indicia and said lines of termination of said sheet of web material.

14. The process of claim 12 wherein said step (e) further comprises the step of automatically controlling said print cylinder and said perforation cylinder to maintain registration of said indicia and lines of termination with a control program.

15. The process of claim 14 wherein said step of automatically controlling said print cylinder and said perforation cylinder to maintain registration of said indicia and lines of termination with a control program further comprises the step of comparing a digital signal from said print cylinder and a digital signal from said perforation cylinder, wherein said comparison of said digital signal from said print cylinder and said digital signal from said perforation cylinder corrects said second angular position of said perforation cylinder relative to said first angular position of said print cylinder.

16. The process of claim 15 wherein said digital from said print cylinder is provided by a proximity switch that senses a flag or other marker cooperatively associated with said print cylinder.

17. The process of claim 15 wherein said digital signal from said perforation cylinder is provided by a position resolver cooperatively associated with said rotatable blade.

18. The process of claim 12 wherein said step (c) further comprises the step of imparting perforations to said sheet of web material with said rotatable blade.

19. The process of claim 12 further comprising the step of providing said sheet of web material with chop-off cuts.

20. A process for registering lines of termination with indicia in a transported sheet of web material, the process comprising the steps of:

(a) transporting said sheet of web material in a first direction;

(b) applying indicia to said sheet of web material from at least a first print cylinder having a first angular position;

(c) imparting lines of termination to said sheet of web material with at least a first perforation cylinder having a second angular position, wherein said indicia and said lines of termination are disposed upon said sheet of web material relative to each other such that an indicia/lines of termination registration is created;

(d) measuring an angular position of a first print cylinder and translating said position into a digital signal;

(e) measuring an angular position of a first perforation cylinder and translating said position into a digital signal;

(f) comparing said digital signal of said first print cylinder and said digital signal of said first perforation cylinder to provide a position error; and, (g) correcting said angular position of said first perforation cylinder according to said position error in order to maintain said indicia/lines of termination registration within a desired range.

* * * * *